United States Patent
Carminati et al.

(10) Patent No.: US 6,500,785 B1
(45) Date of Patent: Dec. 31, 2002

(54) WATER-BASED DRILLING FLUID CONTAINING ANIONS WITH A HIGH HYDRODYNAMIC RADIUS

(75) Inventors: Stefano Carminati, Monza (IT); Marco Brignoli, Brugherio (IT)

(73) Assignees: ENI S.p.A., Rome (IT); Enitecnologie S.p.A., San Donato Milanese (IT)

( * ) Notice: Subject to any disclaimer, the term of this patent is extended or adjusted under 35 U.S.C. 154(b) by 116 days.

(21) Appl. No.: 09/722,004

(22) Filed: Nov. 27, 2000

(30) Foreign Application Priority Data

Nov. 26, 1999 (IT) .......................... MI99A2472

(51) Int. Cl.[7] ................................. C09K 7/02
(52) U.S. Cl. ................ 507/103; 507/138; 507/140; 507/145
(58) Field of Search .................. 507/103, 138, 507/140, 145

(56) References Cited

U.S. PATENT DOCUMENTS

| | | | | |
|---|---|---|---|---|
| 3,112,233 A | * | 11/1963 | Friedman et al. | 507/138 |
| 3,115,197 A | * | 12/1963 | Larsen | 507/145 |
| 4,539,122 A | * | 9/1985 | Son et al. | 507/103 |
| 5,620,947 A | | 4/1997 | Elward-Berry | |
| 5,849,674 A | * | 12/1998 | Fox et al. | 507/140 |

FOREIGN PATENT DOCUMENTS

| | | |
|---|---|---|
| EP | 0 730 018 | 9/1996 |
| WO | WO 99/47624 | 9/1999 |

* cited by examiner

*Primary Examiner*—Philip Tucker
(74) *Attorney, Agent, or Firm*—Oblon, Spivak, McClelland, Maier & Neustadt, P.C.

(57) ABSTRACT

Composition of water-based drilling fluids characterized in that they comprise anions with a high hydrodynamic radius.

6 Claims, 1 Drawing Sheet

WATER-BASED DRILLING FLUID CONTAINING ANIONS WITH A HIGH HYDRODYNAMIC RADIUS

The present invention relates to a water-based drilling fluid containing anions with a high hydrodynamic radius, more specifically salts of alkaline or earth-alkaline metals or ammonium, of carboxylic and/or sulfonic acids, or relative mixtures, whose anion has a hydrodynamic radius higher than 25 Å, even more specifically potassium pivalate.

In the drilling of oil wells with water-based fluids instability problems often arise in shales. These are due to two main factors:
1) the reactivity of claystone to water and
2) the propagation of the pressure from the mud column to the inside of the formation which modifies the stress within the rock causing it to break. Among the various methods used for stabilizing shales, those which attempt to reduce the reactivity of the shale by the use of quaternary potassium or ammonium salts [Gray G. R. and Darley H. C. H.: "Composition and properties of oil well drilling fluids"; Gulf Publishing Company, fourth edition, Houston Tex. (U.S.A.), 1980, page 379] and, with respect to the second point, those which attempt not to modify the shale pore pressure, are the most widely applied. In this respect two procedures are adopted:
2a) blocking the micropores of the shales, by means of inorganic salts which precipitate when they come into contact with the formation water [Clark, D. E. and Benaissa, S.: "Aluminum Chemistry Provides Increased Shale Stability with Environmental Acceptability", paper SPE 25312 presented at the 1993 SPE Asia Pacific Oil and Gas Conference and Exhibition, February 8–10; Felixberger, J.: "Mixed Metal Hydroxide (MMH). A novel and unique inorganic viscosifier for drilling fluids. Ed. Royal Society of Chemistry, 1994] or with microdrops of a phase immiscible in water which may be a polymer with Cloud Point [Bland, R. G., Smith, G. L. and Eagark, P.: "Low Salinity Polyglycol Water-Based Drilling Fluids as Alternatives to Oil-Based Muds", paper SPE/IADC 29378, presented at the 1995 SPE/IADC Drilling Conference, Amsterdam, The Netherlands, February 28–March 2];
2b) preparing drilling fluids with high concentrations of salt (sodium, potassium or calcium salts) in order to extract the water contained in the clay layers as a result of osmotic effect [O'Brien, D. E. and Chenevert, M.: "Stabilizing Sensitive Shales with Inhibited, Potassium-Based Drilling Fluids", JPT, (September 1973), 1089–1100]. In this way the pressure of the water contained in the clay layers is reduced and the stability of the well walls improved [van Oort, E., Hale, A. H. and Mody, F. K.: "Manipulation of Coupled Osmotic Flows for Stabilisation of Shales Exposed to Water-Based Drilling Fluids", paper SPE 30499 presented at the 1995 SPE Annual Technical Conference and Exhibition, Dallas, Tex., U.S.A., October 22–25].

All these processes of the prior art however have the disadvantage of not being very effective.

A composition of drilling fluids has now been found, which is particularly effective in reducing the pressure of drilling fluids by osmotic effect.

In accordance with this, the present invention relates to a composition of water-based drilling fluids containing anions with a high hydrodynamic radius, more specifically salts of alkaline or earth-alkaline metals or ammonium, of carboxylic and/or sulfonic acids, or relative mixtures, whose anion has a hydrodynamic radius higher than 25 Å, even more specifically potassium pivalate.

Typical examples of anions having a hydrodynamic radius higher than 25 Å are dimethylmalonate, 3,5-dinirobenzoate, crotonate, fumarate, glutarate, malate, naphthylacetate, picrate, pivalate.

In the preferred embodiment, carboxylic acid is the pivalic acid and the cation is potassium. In this case the potassium pivalate is preferably in a concentration ranging from 0.1 to 1.7 moles per liter, even more preferably from 0.2 to 1.0 moles per liter.

As is known to experts in the field, the composition of drilling fluids of the present invention may comprise other additives, such as viscosifiers (polymers and clays), pH regulators, biocides, lubricants, filtrate reducers.

The pressure transmission test (PTT) is used to verify the osmotic effect. With this it is possible to measure the pressure of the formation fluids and drilling fluid. The greater the difference in pressure between the mud (at a higher pressure) and the formation fluids, the more effective is the formulate. It is thus possible to compare the effectiveness of various formulations. The test is briefly described hereunder.

Pressure Transmission Test

The sample of claystone is inserted in a rubber sheath, closed at the ends by two steel heads and is placed in the cell where it is pressurized and heated. The two heads are connected to two independent hydraulic circuits which operate under high pressure conditions; one of these (mud circuit) is an open circuit where a solution (which can be pore water or a drilling fluid) is pumped and laps against one of the two sides of the cylindrical sample. The pressure of the mud is kept constant by a "back pressure regulator"; the volume of the part of the circuit under pressure during the test is 22 cc. A piezoresistive transducer continuously measures the internal pressure of the circuit just before the fluid enters the cell. The other circuit (pore circuit) has an internal volume of 22 cc, with an additional pressure area of 38 cc for a total of 60 cc. This contains a fluid having a composition similar to the pore fluid whose pressure is measured by a piezoresistive transducer. A computer records cell temperature (T), pressure of the pore circuit (Ppore) and of mud circuit (Pmud), by means of an acquisition interface.

Measurement procedure. The experiments are carried out according to the following phases:

Consolidation

The sample of claystone is brought to the desired temperature and pressure conditions; in our case, this is maintained for 2 days at a temperature of 80° C., a confinement pressure of 200 bars, a pressure in the pore circuit, containing simulated pore fluid, of 100 bars under static conditions and a pressure in the drilling fluid circuit, which in this phase contains simulated pore fluid, of 100 bars under flow conditions.

Evaluation of the Drilling Fluid

The pore fluid, circulating in the mud circuit, is substituted with test fluid (formulated with salts or with salts and clay inhibitor additives). When all the pore fluid circulating in the mud circuit has been replaced by test fluid, the pressure in the mud circuit is raised to 120 bars and is maintained constant for the whole duration of the test. The effectiveness of the test fluid in establishing a pressure difference by osmotic effect, is evaluated by the pressure trend in the pore circuit over a period of time and in particular by its equilibrium value.

EXAMPLE 1

Three saline solutions are prepared at a concentration of 0.67 moles/liter. After the consolidation phase of the clay test sample at a temperature of 80° C., a confinement pressure equal to 200 bars, a pressure of the mud circuit and of the formation fluids equal to 100 bars (point 1 of the procedure described above), the fluid circulating in the mud circuit is substituted with one of the three saline solutions (point 2 of the procedure). After about 6 hours an equilibrium condition is reached with the pressure of the mud which has maintained its initial value and the pressure of the pore fluid which has become stabilized at a lower value. The Table indicates the differences between the mud pressure and pore fluid pressure for 4 different experiments with 4 different solutions. The first solution has the same composition as the formation fluid and there is no pressure unbalance. For the others, a differentiation in favour of potassium pivalate is observed.

TABLE

| Salt in solution at a concentration of 0.67 moles/liter | Pressure difference between mud and formation fluids |
| --- | --- |
| — | 0 |
| Potassium chloride | 5 |
| Potassium acetate | 9 |
| Potassium pivalate | 14 |

It can be observed that there is a relation between anion size and its effectiveness; in particular, the greater the anion size, the greater is the difference in pressure between mud and formation (FIG. 1). This suggests the use of potassium pivalate for the stabilization of the clay formations.

Figure 1:
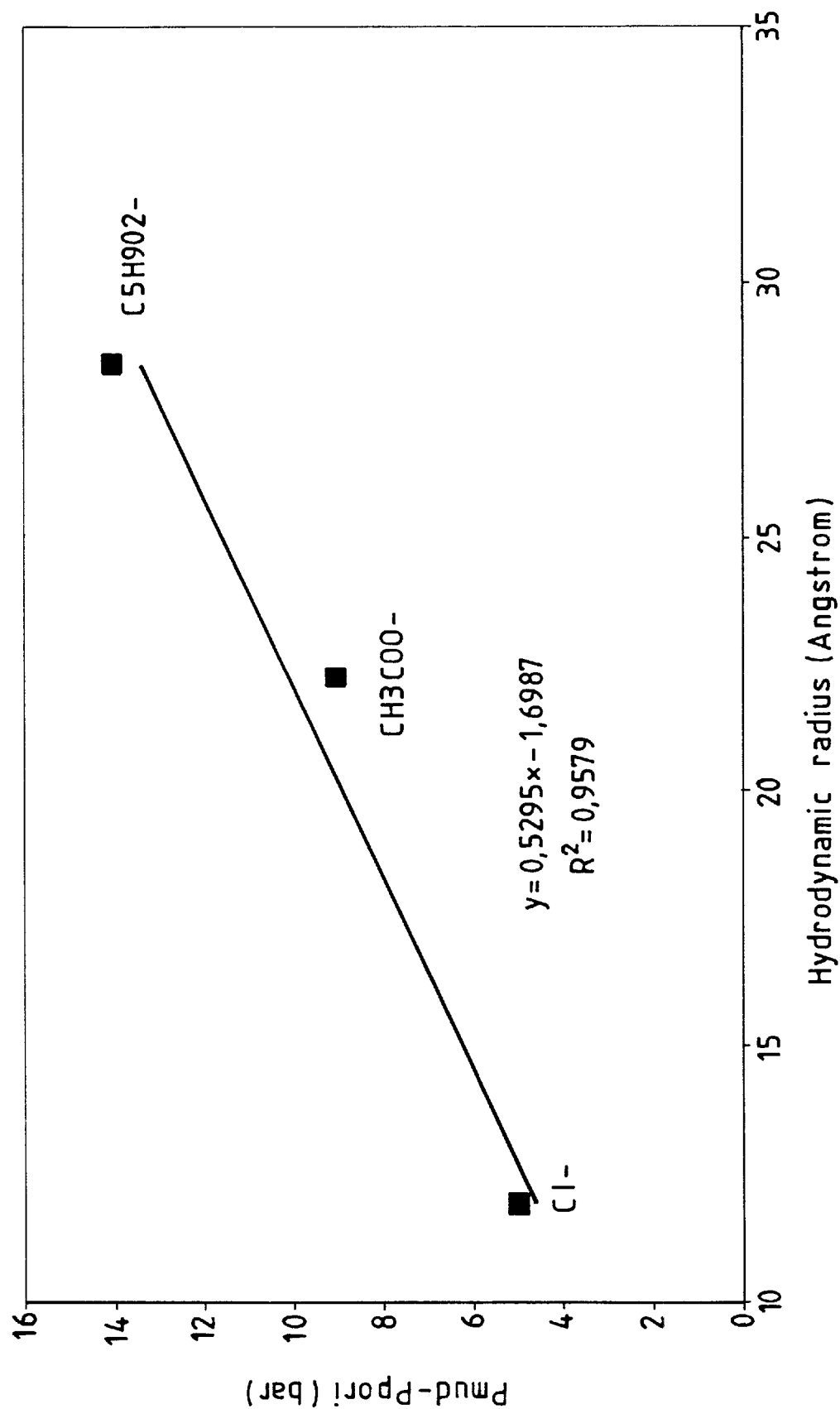
FIG. 1 shows the pressure difference between mud and formation fluids versus the hydrodynamic radius of anions.

What is claimed is:

1. A water-based drilling fluid comprising potassium pivalate.

2. The drilling fluid according to claim 1, wherein the potassium pivalate is present in a concentration ranging from 0.1 to 1.7 moles per liter.

3. The drilling fluid according to claim 2, wherein the potassium pivalate is present in a concentration ranging from 0.2 to 1.0 moles per liter.

4. The drilling fluid according to claim 1, further comprising at least one viscosifier, pH regulator, biocide, lubricant and filtrate reducer.

5. The drilling fluid according to claim 2, further comprising at least one viscosifier, pH regulator, biocide, lubricant and filtrate reducer.

6. The drilling fluid according to claim 3, further comprising at least one viscosifier, pH regulator, biocide, lubricant and filtrate reducer.

* * * * *

UNITED STATES PATENT AND TRADEMARK OFFICE
CERTIFICATE OF CORRECTION

PATENT NO.     : 6,500,785 B1                                                    Page 1 of 1
DATED           : December 31, 2002
INVENTOR(S)  : Carminati et al.

It is certified that error appears in the above-identified patent and that said Letters Patent is hereby corrected as shown below:

<u>Title page,</u>
Item [30], Foreign Application Priority Data, should read:
-- [30]          Foreign Application Priority Data
Nov. 26, 1999 (IT) ............................. MI99A002472 --

Signed and Sealed this

Twentieth Day of May, 2003

JAMES E. ROGAN
*Director of the United States Patent and Trademark Office*